(12) United States Patent
Lueker

(10) Patent No.: US 6,731,687 B1
(45) Date of Patent: May 4, 2004

(54) DYNAMIC LINE BALANCING SCHEME FOR PROVIDING INTER-PACKET SQUELCH

(75) Inventor: Jonathan Lueker, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/422,890

(22) Filed: Oct. 22, 1999

(51) Int. Cl.7 .............................................. H04L 25/02
(52) U.S. Cl. ........................................ 375/257; 333/12
(58) Field of Search ................................. 375/257, 319, 375/377, 287, 288; 326/33, 30, 86, 87; 327/307; 333/12, 17.1, 27

(56) References Cited

U.S. PATENT DOCUMENTS 6,124,727 A * 9/2000 Bridgewater, Jr. et al. .... 326/33
6,304,923 B1 * 10/2001 Klein .......................... 710/41
6,308,215 B1 * 10/2001 Kolbet et al. ............... 709/233

* cited by examiner

*Primary Examiner*—Tesfaldet Bocure
*Assistant Examiner*—Kevin M Burd
(74) *Attorney, Agent, or Firm*—Blakely, Sokoloff, Taylor & Zafman LLP

(57) ABSTRACT

A method for dynamically balancing a serial data link is disclosed. The serial data link includes a first transmission line and a second transmission line. The method includes the steps of creating a DC offset voltage between the first and second transmission lines when the serial data link is in an idle state. When the serial data link is in use to carry data, the DC offset voltage between the first and second transmission lines is removed.

20 Claims, 3 Drawing Sheets

DYNAMIC LINE BALANCING SCHEME FOR PROVIDING INTER-PACKET SQUELCH

BACKGROUND OF THE INVENTION

1. Field of the Invention

The present invention relates to bidirectional, differential, high speed serial data links, and more particularly, to a line balancing scheme for such data links.

2. Background Information

The Universal Serial Bus (USB) is a cable bus that supports data exchange between a host computer (USB host) and a wide range of simultaneously accessible peripherals (USB devices). The USB physical interconnect is a tiered star topology. A hub is at the center of each star. Each wire segment is a point-to-point connection between the USB host and a hub or a USB device, or a hub connected to another hub or USB device. The USB host contains host controllers that provide access to the USB devices in the system. FIG. 1 shows a schematic view of the USB architecture. For more detailed information on USB, the reader is invited to review the "Universal Serial Bus Specification—Version 1.1" published Sep. 23, 1998.

A new, high speed mode being defined for USB can be classified as a bi-directional, differential, high speed, serial data link. One characteristic of bi-directional, differential, high speed, serial data links is that data packets are separated by intervals of "silence" where signals are not being transmitted on the data link. In such links, there is an inherent conflict between two opposing goals. On the one hand it is desirable to maintain a DC voltage balance between the two conductors which form the link in order to achieve the highest possible signal noise margin during transmission. However, on the other hand, having the lines at the same voltage during transmission of packets can potentially lead to unwanted noise pick up or oscillation in the receivers during silent intervals.

In the prior art, attempts to solve this problem were to permanently apply a DC voltage offset onto the two signaling lines. While the DC voltage offset reduces unwanted noise pick up and oscillation, the voltage offset causes reduced noise margin in the data link.

Another solution is the inclusion of a hysteresis loop in the receivers with the hysteresis window greater than the peak noise. Once again, although this reduces noise pick up and oscillation in the receivers, the noise margin is reduced.

In yet another prior art approach, the receivers are disabled during inter-packet transmission times. This approach is effective, but presents the problem of having to enable the receiver when the transmitter is about to transmit. In tightly timed systems this is possible, but in systems with loose or indeterminate timing, this is difficult.

Thus, what is needed is a method and apparatus for increasing the noise margin in a serial data link while reducing unwanted noise pick up and oscillation in the receivers.

SUMMARY OF THE INVENTION

A method for dynamically balancing a serial data link is disclosed. The serial data link includes a first transmission line and a second transmission line. The method includes the steps of creating a DC offset voltage between the first and second transmission lines when the serial data link is in an idle state. When the serial data link is in use to carry data, the DC offset voltage between the first and second transmission lines is removed.

BRIEF DESCRIPTION OF DRAWINGS

The present invention will be described in conjunction with the accompanying Figures, wherein.

DETAILED DESCRIPTION OF THE INVENTION

Figure 1:
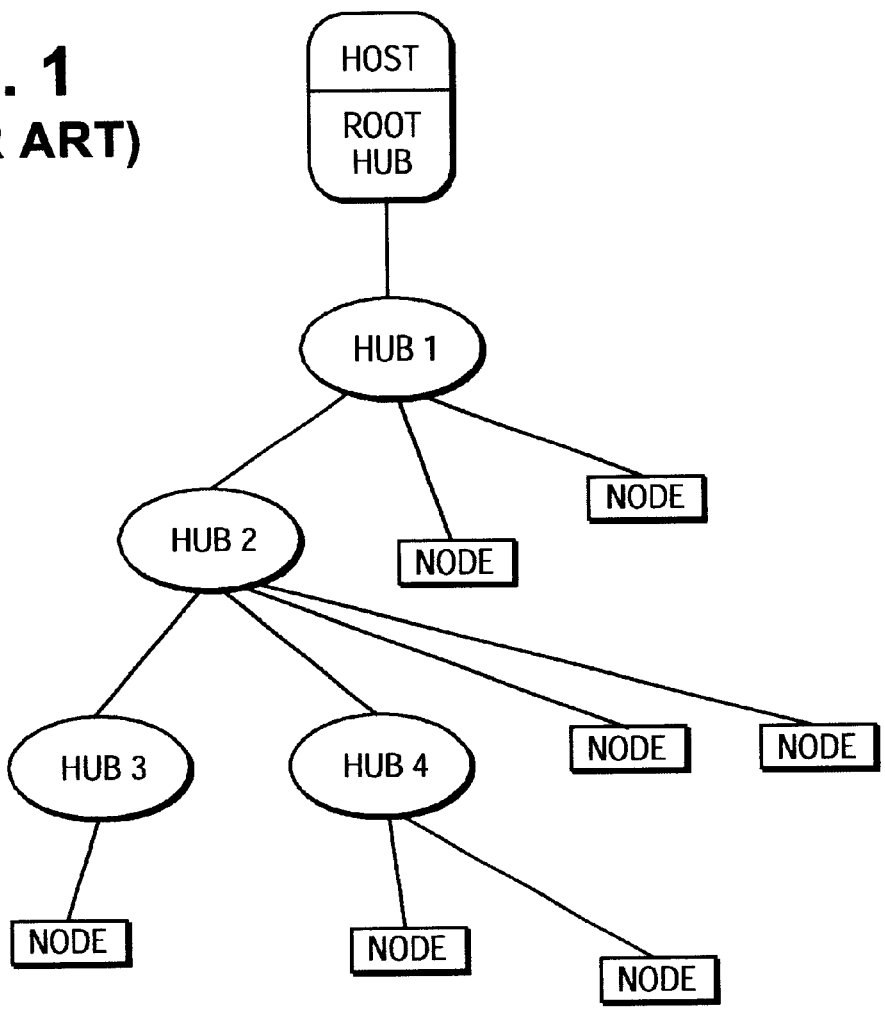
FIG. 1 is a schematic diagram of the tiered starred topology used in the USB architecture.
Figure 2:
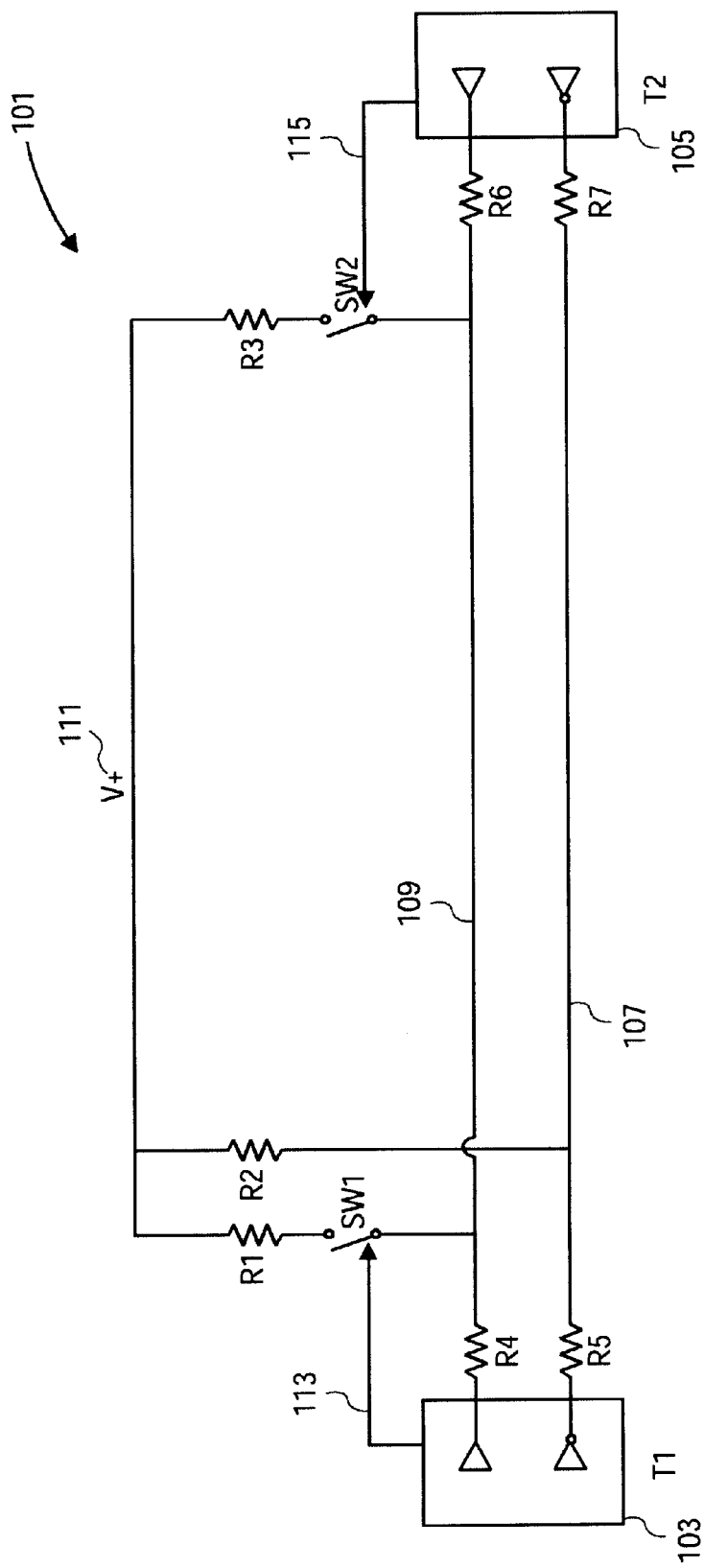
FIG. 2 is a schematic diagram of a circuit formed in accordance with the present invention.

FIG. 2 shows a schematic diagram of a circuit formed in accordance with the present invention. The diagram includes two transceivers: a first transceiver T1 designated by reference numeral 103 and a second transceiver T2 designated by reference numeral 105. The transceivers 103 and 105 can be any device that can transmit and receive data packets over the data link. In the preferred embodiment, the data link conforms with the USB specification. However, the present invention may be used with any data link. In the preferred embodiment, the transceivers may be USB devices, hub controllers, hub hosts, and any other device that will use the USB data link.

The data link itself is represented schematically by a first signaling line 107 and a second signaling line 109. Each termination of each of the lines 107 and 109 are terminated by a resistor. In FIG. 2, the resistors are designated R4, R5, R6, and R7. These resistors are generally of equal value and are selected to correctly terminate the differential link between transceivers 103 and 105. Typically, the resistor values are on the order of 45 ohms. The above described portion of the circuit of FIG. 2 is known in the art. In accordance with the present invention, additional switches, resistors, and a pull up voltage are added to the circuit to implement the present invention.

In particular, a voltage source V+111 (also referred to as a pull-up voltage) is selectively applied to the two transmission lines 107 and 109. The voltage source V+111 is continuously applied through a resistor $R_2$ to the first transmission line 107. Additionally, the voltage source V+111 can be selectively applied to the second transmission line 109 through a resistor $R_1$ and a switch $SW_1$. Further, the voltage source V+111 can be selectively applied to the second transmission line 109 through a resistor $R_3$ through a switch $SW_2$.

The operation of switch $SW_1$, is controlled by a first control signal provided by the first transceiver 103. The first control signal is carried by a first control signal line 113. The operation of second switch $SW_2$ is controlled by a second control signal provided by the second transceiver 105. The second control signal is carried by a second control signal line 115.

Generally, it is preferred that the resistor values $R_1$, $R_2$, and $R_3$ are all the same value and preferably on the order of 1.5 Kohms. By having the resistors $R_1$, $R_2$, and $R_3$ all have substantially the same value, as will be seen below, the voltage differential applied to the first and second transmission lines 107 and 109 during operation will be the same. Further, the values of resistors $R_1$, $R_2$, and $R_3$ are generally considerably higher than the resistors $R_4$–$R_7$.

The present invention seeks to introduce a DC offset between the two transmission lines 107 and 109 such that one transmission line is at a sufficiently higher voltage potential than the other transmission line to overcome noise and oscillation problems associated with a voltage balanced condition. Thus, when neither of the two transceivers 103 or 105 are transmitting, and the data link is idle, the data link is in a deterministic state.

For example, the imposition of a DC offset is accomplished by the present invention by having the resistor $R_2$ always connected to the pull up voltage source V+111. This will result in the voltage on the first transmission line 107 to be pulled up. The magnitude of the pull up voltage would be a function of the combination of the pull up voltage source V+111 and the values of resistors $R_2$, $R_5$ and $R_7$. In a preferred embodiment the DC offset resulting from the pull up voltage source V+111 would be on the order of 50 to 100 millivolts.

However, when either of the two transceivers 103 or 105 are about to transmit data, it is desirable to eliminate the DC offset between the two transmission lines 107 and 109. Thus, when a transceiver 103 or 105 is preparing to transmit, the transceiver causes an equal DC voltage to be placed onto the second transmission line 109 that overcomes the offset provided by the voltage source V+111 and the resistor $R_2$ onto the first transmission line 107. A brief interval is allowed prior to starting transmission of data to allow the line to balance and stabilize.

Specifically, if the transceiver 103 is about to transmit data, it would send a control signal through the first control signal line 113 to switch $SW_1$ causing it to close. Because resistors $R_1$ and $R_2$ are nominally equal, the pull up voltage applied onto the lines 107 and 109 will be nominally equal. This provides an ideal noise margin situation. Because data is transmitted differentially, an improved noise margin is present because the DC offset is now absent. Following the completion of transmission of data, the transceiver 103 sends a control signal along first control signal line 113 causing switch $SW_1$, to open, thereby allowing the second transmission line 109 to return to its deterministic DC voltage offset quiescent state relative to the first transmission line 107.

Similarly, if the transceiver 105 is about to transmit data, it would send a control signal through the second control signal line 115 to switch $SW_2$ causing it to close. Because resistors $R_3$ and $R_2$ are nominally equal, the pull up voltage applied onto the lines 107 and 109 will be nominally equal. This provides an ideal noise margin situation. Because data is transmitted differentially, an improved noise margin is present because the DC offset is now absent. Following the completion of transmission of data, the transceiver 105 sends a control signal along second control signal line 115 causing switch $SW_2$ to open, thereby allowing the second transmission line 109 to return to its deterministic DC voltage offset quiescent state relative to the first transmission line 107.

Figure 3:
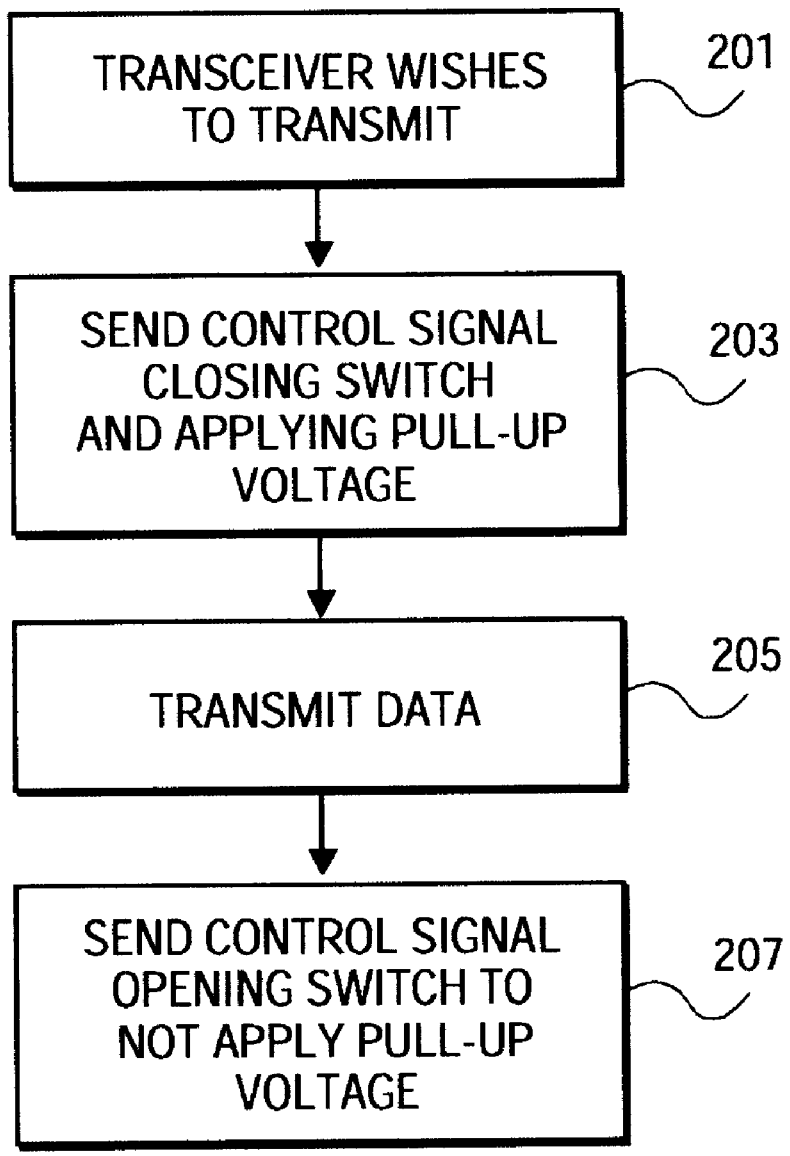
FIG. 3 is a flow diagram illustrating the method of the present invention utilizing the circuit of FIG. 1.

Turning to FIG. 3, a flow diagram illustrating the steps of the present invention is illustrated. First, at a box 201, a transceiver is selected to transmit. Next, at box 203, a control signal is sent from the transmitting transceiver along its control signal line which closes its associated switch and applies the pull up voltage V+111 to the second transmission line 109. For example, if transceiver 103 wishes to transmit data, a control signal would be sent along first control signal line 113 to switch $SW_1$ closing the switch and applying the pull up voltage V+111 through resistor $R_1$ to the second transmission line 109. After this has been accomplished, at box 205, using conventional methods, the data is transmitted over the transmission lines 107 and 109 to the receiving transceiver 105. Finally, at box 207, once the data has been completely transmitted, a control signal is sent along first control signal line 113 by the transceiver 103 to the switch $SW_1$, instructing the switch $SW_1$, to open, thereby removing the pull up voltage V+111 from the second transmission line 109. This places the two transmission lines 107 and 109 in a DC voltage offset state which reduces noise pick up and oscillations in the receivers.

While the preferred embodiment of the invention has been illustrated and described, it will be appreciated that various changes can be made therein without departing from the spirit and scope of the invention.

What is claimed is:

1. A method for dynamically balancing a serial data link, said data link including a first transmission line and a second transmission line, the method comprising:

applying an offset voltage source to said first transmission line and not to said second transmission line to create a DC offset voltage between said first transmission line and said second transmission line when said serial data link is in an idle state; and removing said DC offset voltage between said first transmission line and said second transmission line when said serial data link is used to carry data.

2. The method of claim 1 wherein removing said DC offset voltage includes applying said offset voltage source to both said second transmission line and said first transmission line.

3. The method of claim 1 wherein removing said DC offset voltage includes removing said offset voltage source from said first transmission line.

4. The method of claim 1 wherein said offset voltage source is applied to said first transmission line through a first resistor.

5. The method of claim 2 wherein said offset voltage source is applied to said first transmission line through a first resistor and to said second transmission line through a second resistor, said second resistor substantially equivalent in value to said first resistor.

6. The method of claim 1 wherein applying said offset voltage source results in a DC offset voltage on the order of 50–100 millivolts.

7. A Universal Serial Bus (USB) transmission system comprising:

a first USB transceiver;

a second USB transceiver;

a serial data link to carry data between said first USB transceiver and said second USB transceiver, said serial data link including a first transmission line and a second transmission line; and a pull up voltage source to selectively apply a DC offset voltage onto said first transmission line and not onto said second transmission line when said serial data link is in an idle state.

8. The transmission system of claim 7 wherein said pull up voltage source is controlled to selectively apply said DC offset voltage by said first USB transceiver or said second USB transceiver.

9. The transmission system of claim 7 wherein said pull up voltage source is continuously applied to said first transmission line and said pull up voltage source may be selectively applied to said second transmission line when said serial data link is used to carry data.

10. The transmission system of claim 9 wherein said pull up voltage source is controlled to selectively apply said DC offset voltage onto said second transmission line by said first USB transceiver or said second USB transceiver.

11. The transmission system of claim 10 wherein said pull up voltage source is applied to said second transmission line through a switch controlled by either said first USB transceiver or said second USB transceiver.

12. The transmission system of claim 9 wherein said pull up voltage source is controlled to selectively apply said DC offset voltage onto said second transmission line by said first USB transceiver through a first switch and said pull up voltage source is controlled to selectively apply said DC offset voltage onto said second transmission line by said second USB transceiver through a second switch.

13. The transmission system of claim 7 wherein said pull up voltage source applies a DC offset voltage in the range of 50–100 millivolts.

14. A serial data link to carry data between a first transceiver and a second transceiver, the serial data link comprising:
 a first transmission line;
 a second transmission line; and
 a pull up voltage source to selectively apply a DC offset voltage onto said first transmission line and not onto said second transmission line when said serial data link is in an idle state.

15. The link of claim 14 wherein said pull up voltage source is controlled to selectively apply said DC offset voltage by said first transceiver or said second transceiver.

16. The link of claim 14 wherein said pull up voltage source is continuously applied to said first transmission line and said pull up voltage source may be selectively applied to said second transmission line when said serial data link is used to carry data.

17. The link of claim 16 wherein said pull up voltage source is controlled to selectively apply said DC offset voltage onto said second transmission line by said first transceiver or said second transceiver.

18. The link of claim 17 wherein said pull up voltage source is applied to said second transmission line through a switch controlled by either said first transceiver or said second transceiver.

19. The link of claim 14 wherein said pull up voltage source is controlled to selectively apply said DC offset voltage onto said second transmission line by said first transceiver through a first switch and said pull up voltage source is controlled to selectively apply said DC offset voltage onto said second transmission line by said second transceiver through a second switch.

20. The transmission system of claim 14 wherein said pull up voltage source to apply a DC offset voltage in the range of 50–100 millivolts.

* * * * *